Figure 1:
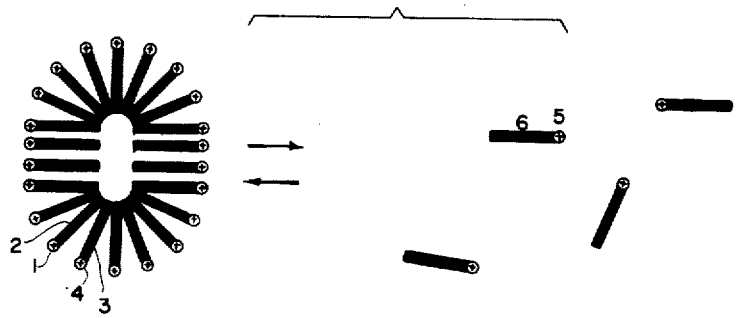

Aug. 6, 1957 G. B. ALEXANDER ET AL 2,801,902
PLANAR AGGREGATES OF SILICA SPHEROIDS
AND METHODS FOR PREPARING SAME
Filed Oct. 15, 1951 2 Sheets-Sheet 1

INVENTORS:
GUY B. ALEXANDER
and RALPH K. ILER
BY
*Albert B. Griggs &*
*Fred C. Carlson*
ATTORNEYS Aug. 6, 1957

G. B. ALEXANDER ET AL 2,801,902

PLANAR AGGREGATES OF SILICA SPHEROIDS
AND METHODS FOR PREPARING SAME

Filed Oct. 15, 1951

2 Sheets-Sheet 2

INVENTORS:
GUY B. ALEXANDER
and RALPH K. ILER
BY
Albert B. Griggs &
Fred C. Carlson
ATTORNEYS

United States Patent Office 2,801,902
Patented Aug. 6, 1957

2,801,902

PLANAR AGGREGATES OF SILICA SPHEROIDS AND METHODS FOR PREPARING SAME

Guy B. Alexander and Ralph K. Iler, Wilmington, Del., assignors to E. I. du Pont de Nemours & Company, Wilmington, Del., a corporation of Delaware Application October 15, 1951, Serial No. 251,394

7 Claims. (Cl. 23—182)

This invention relates to planar aggregates of amorphous silica spheroids. It is also directed to processes for making such aggregates by adding a cationic surface-active agent to a silica sol to form planar aggregates and then strengthening the aggregates with amorphous silica.

In the drawings,

Figure 1 illustrates a micelle of a typical cationic surface-active agent, and

Figure 2:
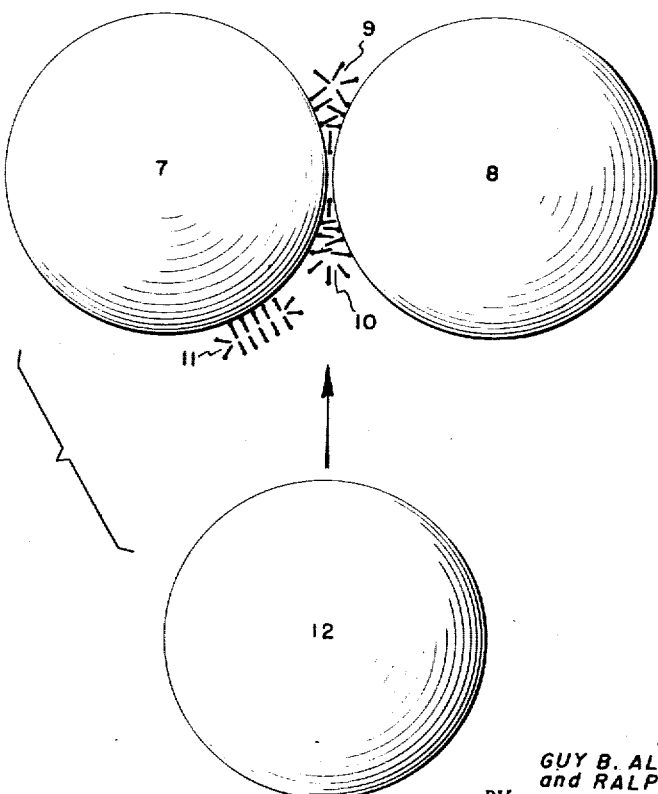
Figure 3:
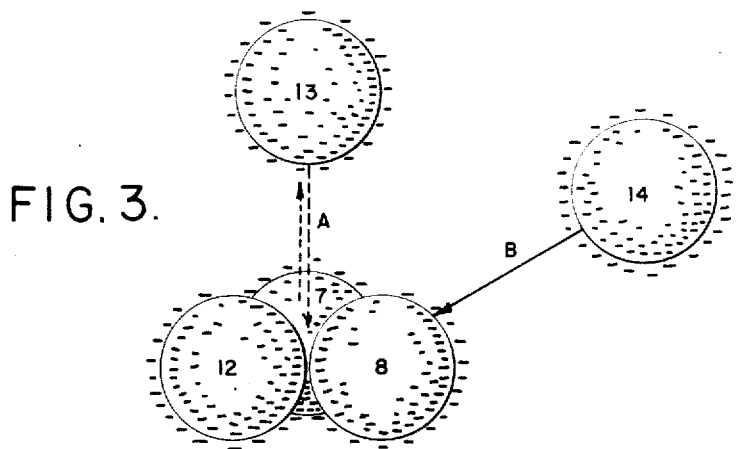
Figure 4:
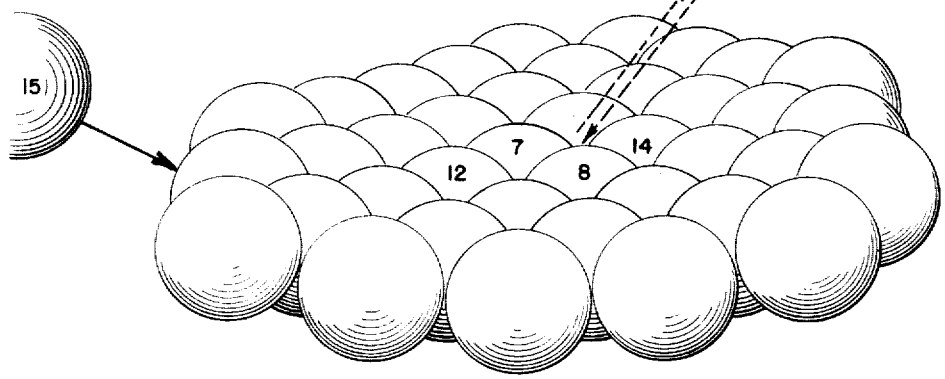
Figure 5:
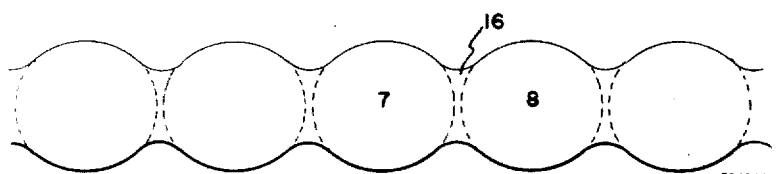

Figure 2 illustrates the aggregation of a pair of silica spheroids and shows also the action of a typical negatively charged spheroid approaching such a pair, and Figure 3 shows three aggregated silica spheroids and illustrates the action of negatively charged spheroids approaching the aggregation, and Figure 4 illustrates a planar aggregation of silica spheroids of the invention, and Figure 5 illustrates a section of a planar aggregation in which the spheroids have been strengthened according to processes of the invention.

Referring to the drawing in more detail reference should be had to Figure 1 in which there is illustrated a micelle of a typical cationic surface-active agent. At the right of Figure 1 there will be seen a single molecule of the cationic agent. The positive portion is numbered 5 and is represented by a circle and the hydrophobic tail of the surface-active cation is numbered 6. It will be understood that in the solution surrounding the cation there will be an equal number of counter-anions such as chloride or sulfate which however are not shown.

At the left of Figure 1 there is shown a colloidal micelle made up of an assembly of the cations such as just described. The mode of association of the molecules of such cationic surface-active agents is generally well understood and is illustrated largely because of the use of this configuration in the following drawings to show the relationship of the cationic agents to silica spheroids.

It will be seen that the micelle of the cationic surface active agent in Figure 1 and the ions which are shown separately are represented as being in equilibrium. This represents their state in aqueous solutions. In the assembly of cationic surface-active agent molecules in the micelle the inner portion of the micelle consists of the hydrophobic groups indicated at 2 and 3 and the external surface of the micelle is made up of the positively charged ionic portions of the molecules numbered 1 and 4.

Referring now to Figure 2, the formation of planar aggregates according to the invention begins through the formation of a pair of silica spheroids 7 and 8 held together through micelles 9 and 10. It will be understood that this is a two dimensional representation of the spheres and, of course, the micelles 9 and 10 may form an annular ring joining the silica particles 7 and 8.

As will be explained further on, the spheroids 7 and 8 are present in a sol and the cationic surface-active agent is added to the sol so that the portions 9 and 10 find their way to the surface of the spheroids. Since the micelles are positively charged and the silica particles are negatively charged, the electrical forces are such that there is an attraction between them.

In the drawing a micelle 11 will be seen held to the surface of the spheroid 7. Another negatively charged silica spheroid 12 will be seen approaching the pair 7—8 through Brownian motion. When the spheroid 12 gets close enough to the positively charged micelle 11 it will become firmly attached and the micelle will rearrange to hold 12 firmly in contact with spheroids 7 and 8.

It is to be noted that in the figures of the drawing after Figure 2, the micelles are not shown, but are to be understood to be present as above indicated.

In Figure 3 there is illustrated a further development of a planar aggregate of spheroidal particles 7, 8, and 12. Here, the approach of spheroidal particles to the aggregate is illustrated to show that under conditions which prevail in processes of the invention the aggregates continue to grow in a plane rather than forming three dimensional figures.

The silica spheroid 14 is shown as approaching the triad of spheroids in the plane of the aggregate. Spheroid 13 is shown approaching from a direction which is perpendicular to the plane of the aggregate. All of the silica surfaces are negatively charged, so that as the spheroid 13 approaches the triad illustrated it is met by stronger repulsion than is encountered by the spheroid 14. This will be evident from an inspection of the drawing, because there are 3 spheroids repelling the spheroid 13 whereas the only forces repelling the spheroid 14 are those coming largely from spheroids 7 and 8. The force being exerted from spheroid 12 against spheroid 14 is comparatively weak because of the greater distance.

It is for this reason that the spheroid 14 can approach the triad and be held to it in the plane of the aggregate by a micelle whereas the spheroid 13 does not approach closely enough to be caught by a micelle on the surface of the spheroids 7, 8 and 12.

In Figure 3, the negative charges on the silica spheroids are shown. It will be understood that such charges are also present on the spheroids of the other figures of the drawing, but are not shown.

The mechanism by which spheroid 14 is held in the aggregate is, of course, the same as that by which the spheroid 12 was held in the previous explanation.

Figure 4 illustrates a further development of the growth of a planar aggregate of spheroids. Further spheroids have added in the plane of the original triad 7, 8, and 12. This process continues, of course, until the planar aggregate contains at least a substantial number of spheroids.

In the illustration in Figure 4 the negative charges are not shown on the particles though it will be understood that the particles are negatively charged as in Figure 3; also the micelles are not shown but it will be understood that the aggregates are held together as in the earlier descriptions. The negatively charged spheroid 13 is again illustrated as approaching the aggregate perpendicular to the plane of the aggregate and of course it is repelled as before. A spheroid 15 is illustrated as approaching in the plane of the aggregate and, of course, it is able to join the aggregate and is held in place along the edge by the micelles of cationic surface active agent.

In Figure 5 there is illustrated the final step in the development of the structure of products of the invention. The planar aggregates are strengthened by silica cementing between the spheroids. The strength of the bond of the micelles of cationic surface active agent is not very great and the planar aggregates at the point illustrated in Figure 4 are quite weak. By the cementing of the particles in manners which will be described hereinafter the planar aggregates assume great strength, so that they will retain their planar form even after removal from the solution.

Figure 5 is a semi-diagrammatic cross section of a planar aggregate such as that of Figure 4 in which the speroids are illustrated in dotted lines and the shape after being cemented is illustrated in solid lines. In Figure 5 it will be seen that spheroids 7 and 8 are cemented together by silica 16.

The spheroids approaching an aggregate may very well carry a micelle such as the micelle 11 shown on the spheroid 7. This is a random matter and the micelles are very labile and rearrange themselves into stable configurations with respect to the spheroids.

The illustration of the formation of planar aggregates represents an ideal condition. There will in fact be some spheroids which will approach the plane of the aggregate from a vertical or nearly vertical direction and will become attached; hence, the plane will not be perfect. However, in the preferred products of the invention the planar aggregates are substantially mono-layers of the spheroids, while less preferred products are those in which there is a second layer of spheroids in patches or even over a considerable portion of the area. Some planar aggregates may form which are two or three particles deep but these will still continue to build up along the edges of the plane more readily than on the surface, so that planar aggregation will continue under the conditions of the processes of the invention.

It is to be understood that the theory herein expressed constitutes no part of the present invention, but is merely an explanation which appears to fit the facts, including electron micrographs, and is in good conformity with scientific theory in related fields.

THE SILICA SPHEROIDS

The silicia spheroids aggregated according to the present invention are in the form of negatively charged aqueous sols of the silica spheroids. In general, any negatively charged silica sol containing amorphous silica may be used; it is much preferred to use sols, however, in which the silica spheroids which compose the sol have a diameter greater than 5 millimicrons and no greater than about 100 millimicrons. It is still preferable to use sols in which the particle size is smaller than 50 millimicrons. As will be observed more fully hereinafter it is also possible to use sols which under the conditions of aggregation form particles which are within these preferred size limits.

While, as indicated, a wide range of silica sols may be used, it is preferred to use sols in which the particles are not aggregated to any considerable extent. In other words, the spheroidal particles comprising the sols should be separate and discrete or at the most should be joined in aggregates of 2 or 3.

It will further be understood that it is desirable that the sols be composed of spheroidal particles of fairly uniform particles size though sols may be used in which the particles are diverse in size with the formation of planar aggregates of mixed character. For example, a sol may contain some particles which are 2 or 3 times as large as other particles.

For example, silica spheroids between about 5 and 10 millimicrons in diameter may be prepared by heating to a temperature above 60° C. a silica sol prepared by ion exchange in the manner described in Bird United States Patent 2,244,325 and stabilized by a small amount of alkali. Sols containing particles from about 15 to 100 millimicrons in diameter may be obtained from the foregoing sols by adding further quantities of ion exchange effluent prepared as in the above cited Bird patent until at least 5 times as much silica has been added as was first present. This product is fully described in Bechtold and Snyder United States patent application Ser. No. 65,536, filed December 15, 1948, now Patent No. 2,574,902.

Instead of using such processes as those just described, a suspension of dense units of silica useful in the processes of the present invention may be prepared by adding an acid such as sulfuric to a hot, above 60° C., solution of sodium silicate. The addition is conducted over a period of time at a sodium ion concentration of not more than 0.3 normal. This method is described more fully in Iler United States application Ser. No. 99,349, filed June 15, 1949, and now abandoned.

Alternatively, as described in Iler, Alexander and Wolter United States application Ser. No. 99,350, filed June 15, 1949, now Patent No. 2,601,235, silicate and acid may be added to a heel of amorphous silica nuclei, in the form of a sol, at a temperature above 60° C. and a pH of 8 to 10.7, whereby silica particles may be built up to the desired size.

More lengthy discussions of the applications cited appear unnecessary but it will be understood that any of the sols described may be used. These are generally designated as composed of dens amorphous silica particles. When it is said that the particles are dense it is meant that they are impervious to nitrogen as evidenced by the fact that the specific surface area as determined by nitrogen adsorption is about the same as that which would be calculated from the ultimate particle size as shown by electron micrographs.

Sols prepared by ion exchange as in th Bird Patent 2,244,325 and in the Voorhees Patent 2,457,971 can also be used. It is, however, preferred to use these under such conditions that the particle size grows before the formation of planar aggregates or at least during the formation of the planar aggregates. In general it may be noted that heating the sols to a temperature of 60° C. or higher greatly accelerate the growth of the particles so that they will soon reach the size range of about 5 millimicrons or even a little larger.

It is to be noted that the sols used according to the invention are negatively charged. The silica particles must bear an electrical charge having a sign opposite to that of the cationic agent. Now while silica is known to bear a negative charge in the pH range above 5, this charge becomes appreciable above about pH 7. Thus the pH of a sol should be above 5 for use in processes of the invention, and should preferably be above 7. It should be noted that at a pH above 10.7 the silica spheroids tend to dissolve and pH values above 10.7 thereby interfere with operation of processes of the invention. The use of a pH higher than about 10.7 interferes with the process in the sense that the planar aggregates tend to be dissolved as they are formed.

The negatively charged silica sol should for practical reasons contain at least about one-half percent $SiO_2$. The process can be operated with less but it will be slow and comparatively inefficient. The upper limit on concentration is governed by consideration of the increasing probability of collisions on the planar aggregate on the top and bottom surface. Thus the planar aggregates formed at increasing concentrations tend to be less perfect and are less likely to be monolayers of spheroidal silica units. It is further to be observed that, in highly concentrated solutions, as planar aggregates form the viscosity of the suspension increases markedly and becomes so great as to present operating difficulties. At about 30 percent $SiO_2$ concentration the product tends to be thicker than a monolayer and from a practical standpoint one should not use much higher concentrations than this if all the spheroids in the suspension are to be formed into planar aggregates. However, at this concentration it is possible to operate with small amounts of cationic surface-active agents so as to convert a relatively small proportion of the silica to planar aggregates and to leave the remainder in the form of discrete spheroids and still obtain a fluid suspension of the product.

It is preferred to operate processes of the invention using silica sols which are substantially free of electrolytes other than the alkali required to maintain the pH within the limits already discussed and, of course, the surface active agent. If a particular sol contains salts they may be removed by successive treatments with anion and cation exchangers. Alternatively, they may be removed by dialysis or in any desired manner. It will be understood that the presence of electrolytes tends to reduce the effectiveness of the negative charge upon the silica spheroids in repelling spheroids which are approaching the planar aggregate from the perpendicular. It is quite practical, of course, to operate processes of the invention with some salts present and even with considerable amounts and still obtain products of a very desirable character. Where a sol contains electrolytes it is preferred to dilute it to the point where the concentration of the electrolyte is relatively low. In the case of impurities such as the sulfates and chlorides present in sols made by the reaction of sodium silicate and acid of commercial grade, it is most preferred to keep the sodium ion concentration below about one-tenth normal.

THE CATIONIC SURFACE-ACTIVE AGENTS

The surface-active agents are a well known class of materials which lower the surface tension of water. The cationic surface-active agents are a well known subgroup of these materials which find wide application in industry. The positive charge on the cationic agents may be borne by such atoms as nitrogen, phosphorus, sulfur, or arsenic. Each cationic surface active agent is generally well understood to be useful in certain pH ranges and it will be seen that in selecting a cationic surface active agent for use in a process of the invention only those should be chosen which are effective within the pH ranges previously shown. That is, for example, they should be sufficiently soluble in water at this pH range to permit the use of a sufficient amount. If the surface active agent is quite insoluble it can be brought into contact with the solution by adding it to solution in a suitable solvent.

Typical of cationic surface active agents are cetyl methyl ethyl sulfonium bromide, and similar phosphonium and arsonium compounds may be used. Examples of such cationic surface-active agents are the following: Octyl dimethyl sulfonium iodide, dodecyl dimethyl sulfonium iodide, cetyl dimethyl sulfonium iodide, octyl triethyl phosphonium iodide, dodecyl triethyl phosphonium iodide, cetyl triethyl phosphonium iodide, benzyl dimethyl octyl phosphonium chloride, benzyl dimethyl dodecyl phosphonium chloride, benzyl dimethyl cetyl phosphonium chloride, octyl triethyl arsonium iodide, dodecyl triethyl arsonium iodide, cetyl triethyl arsonium iodide, benzyl dimethyl octyl arsonium chloride, benzyl dimethyl dodecyl arsonium chloride, benzyl dimethyl cetyl arsonium chloride, octyl trimethyl arsonium iodide, dodecyl trimethyl arsonium iodide, and cetyl trimethyl arsonium iodide.

By far the preferred group of cationic surface-active agents to be used in processes of the present invention are the organic nitrogen bases. The primary, secondary, and tertiary amines form the corresponding substituted ammonium salts with acids; for example, hexyl amine will combine with hydrochloric acid to give hexyl ammonium chloride. However, because of the weak nature of this base, compounds of this type exhibit surface activity only at the lower end of the pH range of this invention. It is preferred to use the quaternary ammonium salts of which the cation forms a strong base. Compounds of this type may be used over the whole pH range of this invention providing they are chemically stable and retain their surface activity. Examples of this type of compound are dodecyl trimethyl ammonium bromide, cetyl trimethyl ammonium chloride, lauryl pyridinium chloride, Lorol trimethyl ammonium bromide, octyl trimethyl ammonium chloride, decyl trimethyl ammonium chloride, octadecenyl trimethyl ammonium chloride, and octa deca dienyl ammonium chloride.

The cationic surface-active agents can be used in extremely small amounts to effect planar aggregation according to processes of the invention. The smallest tracts will effect some planar aggregation and it will often be desirable to use very, very small amounts when it is desired to produce a product which contains both planar aggregates and unaggregated silica spheres. The effect is such that it can almost be termed "catalytic." By using very small amounts of reagent and increasing the time of reaction the same effects can be obtained as with larger amounts at shorter periods of time. This is thought to be because the micelles can migrate from point to point and serve effectively as temporary connecting links as the planar aggregates form. In other words, when a silica spheroid approaches the edge of the planar aggregate it may be anchored temporarily to the edge by a micelle of the cationic surface-active agent until a more permanent silica bond is formed, and the particle becomes cemented to the aggregate. The micelle is thus forced out into the solution where it is used again in the process.

Larger amounts can be used and the amounts will ordinarily vary with the particle diameter of the silica spheroids. An amount up to approximately that represented by the following expression may profitably be used.

Mols cationic surface-active agent per 100 grams of $$SiO_2 = \frac{2}{D}$$

where D is the diameter of the silica spheroids in millimicrons.

For most common types of cationic surface active agents this corresponds to about twice the amount of agent theoretically required to cover the surface of the silica spheroids.

In practical operation one will use about a tenth of a percent of a cationic surface-active agent based on the weight of the $SiO_2$ and will use up to about one-tenth of the maximum amount just expressed.

THE PROCESS OF PLANAR AGGREGATION

The processes of this invention can be carried out by simply putting the silica sol in a suitable receptacle and adding the cationic surface-active agent in the desired amount while maintaining the pH as above described. The cationic surface-active agent should be thoroughly mixed into the sol and it is customary, though apparently not necessary, to agitate the sol.

The temperature is not critical, though at lower temperatures somewhat longer times will be required for the formation of a planar aggregate. The amount of the cationic surface-active agent very markedly affects the time and temperature desired. If large amounts of surface-active agents are used, so that a precipitate of a planar aggregate is obtained almost immediately, then room temperatures will be quite sufficient. If only trace amounts of the surface-active agents are used, so that the effect is more in the nature of that of a catalyst, then a longer period of time and elevated temperatures are necessary. The elevated temperatures may vary from anything above room temperature up to boiling. Even higher temperatures may be used by the use of an autoclave.

In connection with the temperature to be chosen it will be noted that when the surface-active agent is used as a "catalyst" the temperature should be above 60° C.

When a silica effluent, obtained by ion exchange as previously mentioned, is used and in which the particles are smaller than about 5 millimicrons, then it will be desirable to heat the mixture of the sol and cationic surface the xylene is dispersed and forms an emulsion. This has already been mentioned above. When a silica sol effluent containing very small particles is mixed with a cationic surface-active agent and heated to a temperature above about 60° C. for some time the planar aggregation and the growth of the particles will occur simultaneously.

Where it is desirable to produce flakes in an aqueous medium and maintain the mixture in a more fluid condition, a water-immiscible solvent such as xylene may be added to the mixture. In the presence of the surface-active agent the water immiscible hydrocarbon such as the xylene is dispersed and forms an emulsion. This emulsion may then be interacted with the silica sol according to processes of the invention. Instead of using xylene one may use toluene, benzene, and petroleum oils.

STRENGHTHENING THE PLANAR AGGREGATES

After the planar aggregates have formed according to the processes above described, it is important that they be strengthened. This can be done by causing the cementing of the speroids with amorphous silica.

A very convenient way of effecting this cementing action is by heating the dispersion of planar aggregates in water in the pH range of the process as already described. This is particularly effective in the case of planar aggregates containing spheroids which are smaller than about 35 millimicrons in diameter. During the heating the individual spheroids in the planar aggregates are spontaneously cemented together in a manner somewhat similar to sintering. Electron micrograph examination of the products shows that the silica has deposited in the interstices between contiguous spheroids to a considerable extent. This method of strengthening the aggregates is particularly useful when the process of aggregation is itself effected at elevated temperatures—for example, when only catalytic amounts of the cationic surface-active agents are used or when an effluent silica from an ion exchanger is used as above described.

The temperature of heating of an aqueous suspension of a planar aggregate should be at least 60° C. and preferably approaches the boiling point of water. Once the planar aggregates have been strengthened somewhat by heating up to 100° C. or thereabouts in suspension they may then be further strengthened by heating in an autoclave at elevated temperatures and pressures. As a practical matter temperatures above about 250° C. will not ordinarily be used.

Before autoclaving the planar aggregates it will ordinarily be desirable to remove the cationic surface active agent to prevent further aggregation. This may be done by treating the aggregates with a suitable solvent for the surface active agent. Of course, it will be understood that if further aggregation is desirable this may be obtained by permitting the surface active agent to remain.

The time of heating to strengthen the planar aggregates will depend upon the temperature and upon the strength of the aggregate wanted. Generally, a few minutes will effect an observable strengthening at temperatures of 100° C. Very short periods of time, even as short as a minute, at temperatures approaching 250° C. will be sufficient.

An alternative method of strengthening the planar aggregates which is particularly useful when the spheroids are greater than about 35 millimicrons in diameter is one in which active silica is added to the aggregates. This process may also be used with advantage for strengthening planar aggregates made up of spheroidal particles of less than 35 millimicrons in diameter.

When sodium silicate is acidified, silicic acid is released. This silicic acid initially may be in the form of orthosilicic acid, Si(OH)$_4$, but a condensation reaction occurs, whereby two silanol

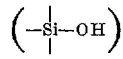

groups react to form a siloxane

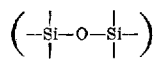

bond. This condensation may proceed until a predominate proportion of the silanol groups present have been used up to form siloxane bonds; the polymer thus formed will have a high molecular weight and the silica in it may be defined as "inactive." On the other hand, it will be understood that by the term "active" silica is meant silica in a low degree of polymerization. Thus, in active silica the condensation between silanol groups has not proceeded to a predominant extent.

It should be understood that active silica includes not only monomeric silica, but also certain polymeric forms of silica which are capable of depolymerization under suitable conditions, and hence are active for the purposes of the present invention. The rate of depolymerization under controlled conditions provides a measure of whether or not a particular silica is active within the meaning of the term as used in describing this invention. Active silica may be defined as any silica in molecular or colloidal aqueous solution in such a state of polymerization that when diluted with sodium hydroxide solution to a pH of about 12, corresponding to an alkali concentration of N/100, and an SiO$_2$ concentration of about 0.02% by weight at 30° C., in the absence of cations other than the sodium, the silica will depolymerize to monomer in not more than 100 minutes.

The amount of monomer in a particular solution may be determined by measuring the amount of color developed with molybdic acid. It was shown by Harman (J. Phys. Chem., vol. 31, 616–25 (1929)) that yellow silico-molybdic complex acid is formed by reaction of molybdic acid with ionic or "crystalloidal silica" but not with colloidal silica. We confirmed this observation, and concluded that only monosilicic acid forms the yellow complex with molybdic acid. Hence, the rate of depolymerization of silica in the dilute alkaline test solution can be followed over a period of time by taking samples and determining the amount of monomer present.

Specifically, the depolymerization test is carried out by adding the silica sample to such quantity of a dilute solution of sodium hydroxide that the pH of the mixture is about 12 (corresponding to 0.01 normality of alkali) and the total concentration of SiO$_2$ is 0.02%. This mixture is held at 30° C. for a measured time after preparation, and then tested for monomer. Five ml. of the depolymerizing solution are mixed with 45 ml. of a molybdic acid reagent made up by diluting 25 ml. of 1 N sulfuric acid and 10 ml. of 10% (by weight) ammonium molybdate solution to a total of 225 ml. The molybdic acid reagent is sufficiently acidic to stop the depolymerization of silica in the test sample. Thus, the time interval of depolymerization is taken as the time between the mixing of the silica sample with sodium hydroxide solution and neutralization of this solution with molybdic acid reagent. The color developed in the depolymerizing solution and the molybdic acid reagent at 30° C. is measured with a Model DU Beckman photoelectric quartz spectrophotometer at a wave length of 400 millimicrons and a cell length of 1 cm. The color reading is taken after about two minutes, since the reaction of monomeric silicic acid with molybdic acid is essentially complete in that time. The amount of monomeric silica corresponding to this color is determined by standardizing the color against a known amount of sodium orthosilicate.

While silica which depolymerizes completely in not more than 100 minutes by the depolymerization test is considered to be active and may be used in the present invention, it is preferred to use silica which will depolymerize completely in not more than 30 minutes. In sodium silicate solutions having an SiO$_2$:Na$_2$O mole ratio below 3.9, the degree of polymerization of the silica is very low, since when these solutions are subjected to the depolymerization test for activity, the time required for formation of monomer is usually less than one minute. Consequently, the silicic acid is released the instant these solutions are acidified in an extremely active form.

An aqueous dispersion of active silica may be prepared at ordinary temperatures for use in this invention by any of a number of methods with which the art is familiar. Methyl silicate or silicon tetrachloride may be hydrolyzed with water under conditions to produce a dilute sol, or sodium ions may be removed from sodium silicate by ion-exchange resins as taught by Bird, United States Patent 2,244,325. The active silica obtained by any of these methods should be used as soon as prepared, because the condensation reaction mentioned above proceeds quite rapidly, rendering the silica inactive.

A method which has outstanding economic advantages in the preparation of active silica for use according to this invention consists in releasing active silica by partially neutralizing a soluble silicate, such as sodium or potassium silicate, with an acid such as sulfuric, hydrochloric, or carbonic, in the pH range of 8 to 11. Preferably, this acidification occurs in the presence of the aggregates of particles prepared as already described, so that the liberated active silica can immediately accrete to the aggregates.

Instead of releasing the active silica in the presence of the aggregates (by the partial neutralization of a silicate with an acid), the acidification may, if desired, be carried on out of contact with the silica aggregates, provided the active silica is caused to accrete to such aggregates before it has become inactive through polymerization—that is, before it has aged or been heated to an elevated temperature.

In order to determine whether the degree of polymerization of the silica is such that it is still in the active range, it may be tested directly, as already described.

An accretion process used in this invention is carried out by releasing active silica in an aqueous suspension of planar silica aggregates, the active silica and aggregates having been selected as described above. As used herein, the word "accrete" refers to a growing together, that is, an adding on or building up by growth, and "accretion" refers to this gradual external addition. In other words, the active silica builds up upon the planar structures already present in the aggregates and reinforces these structures by external growth, rather than extending the structures by adding on additional colloidal, spheroidal units to aggregates already present. As a result of accretion, the particle diameter of the ultimate silica units increases and the specific surface area decreases. During the process it is important to maintain the pH, the alkali metal ion concentration, and the temperature within certain critical limits. It is also important to release the active silica at a critical rate which is determined by the surface area of the silica particles present. These conditions will now be discussed in detail.

The pH during accretion is maintained in the range of about from 8 to 11. Above this range the active silica tends to remain in solution as alkali metal silicate, while below the range the active silica tends to gel before it has had an opportunity to accrete to the aggregates. When the active silica is released by simultaneous addition of acid and alkali silicate, it is preferred to maintain the pH at 9.0 to 10.7, and especially desirable to operate at about pH 10.

The alkali metal ion concentration is maintained below about 0.3 normal during accretion of silica on planar aggregates in a process of this invention, and preferably is held below 0.1 normal. Above 0.3 normal, the rate of coagulation of the active silica is such that gel aggregates tend to be formed, and this should generally be avoided. When the active silica is added in the form of fresh ion-exchange effluent the control of alkali metal ion concentration presents no problem. When the active silica is formed in situ by adding acid and alkali metal silicate, it will often be found desirable to use as high a $SiO_2:Na_2O$ ratio silicate as possible, and dilute the reaction mixture if necessary to hold down the alkali metal ion normality. A normality of 0.05 to 0.3 ordinarily is found to be a practical working range.

The temperature of the reaction mixture is maintained in the range from 60 to 125° C., and preferably about between 80 and 100° C. at atmospheric pressure, or up to about 125° C. under super-atmospheric pressure. Below 60° C., it is difficult to bring about the accretion reaction at a practical rate: and there is no apparent advantage in operating at temperatures above 125° C. It is most preferred to operate close to the boiling point at atmospheric pressure.

The rate at which accretion will occur is related to the pH, the alkali metal ion concentration, the temperature, and the specific surface area of silica in the planar aggregates. Accretion occurs rapidly at about pH 10, and in the presence of sodium ions. Active silica can be accreted more readily at a higher temperature. The relation between time and temperature may be roughly estimated from the observation that the reaction rate doubles for about every 10° C. rise in temperature, within the ranges above mentioned.

As the specific surface area increases, there is more surface on which accretion can occur, and hence accretion can be carried out more rapidly in dispersions containing aggregates of high surface area. However, if active silica is liberated too rapidly in the mixture, it may fail to accrete to the aggregates, but instead may form new nuclei of dense spherical particles. In this event, two families of silica will be present, that is, the planar aggregates and the new nuclei. Upon further addition of active silica, these two families will compete for the active silica, with the result that the planar aggregates will not be reinforced and built up to the desired or expected extent.

During the accretion process, the release of active silica is effected at a rate such that the specific surface area of the silica present decreases. The precipitated silica present includes the aggregates upon which accretion is taking place and also any new aggregates or nuclei formed from the active silica. When active silica accretes as a dense coating on the planar aggregates of silica units, the weight of the aggregates is increased more rapidly than the surface area, so that the specific surface area, which is the area per unit weight, actually decreases. If, however, active silica is added at a higher rate than can be taken up by the accretion, new nuclei of very small particles, having a very great specific surface area, are formed, and the average specific surface area of the precipitated silica in the system will increase, rather than decrease, as expected. Accordingly, it is important to control the rate of release of active silica so that the specific surface area of the precipitated silica in the system decreases during the accretion reaction. This can readily be determined by taking a sample after a particular rate of release and measuring specific surface area by nitrogen adsorption. For instance, a sample may be removed from the reaction medium and filtered on an ordinary Whatman #40 paper, or may be settled out by centrifuging at 3000 R. P. M. for 10 minutes. The precipitate is then reslurried in water, adjusted to a pH of from 3 to 5, refiltered, washed, preferably with water and then with acetone until free from water, and dried at 110° C. The specific surface area of the dried material is measured by nitrogen adsorption by the method of P. H. Emmett, "A new method for measuring the surface area of finely divided materials and for determining the size of particles," Symposium on New Methods for Particle Size Determination in the Sub-Sieve Range, p. 95, published by the American Society for Testing Materials, March 4, 1941. If, for the interval in question, the specific surface area has decreased, the rate of active silica release has been satisfactory. Obviously, the decrease should occur over a reasonable interval of time— that is, over say 5% of the total time of the accretion reaction, because at a particular instant, such as immediately after adding an increment of active silica, there may be no change or even a slight increase in the specific surface area, whereas the net overall result is a decrease.

As a practical matter, of course, it is most feasible to establish a safe rate for releasing active silica, and thereafter maintain this rate by controlling the rate of adding the active silica to the system or the rate of adding the reagent which will release the active silica. In establishing this rate, proper correlation of temperature, alkali metal ion concentration, and pH must be taken into account. This is illustrated in the following preferred case, in which active silica is released by adding sodium silicate and acid simultaneously to a dispersion of silica aggregates.

At 95° C., a sodium ion normality of 0.3, and a pH of 10, and with the silica in the planar aggregates having a specific surface area of about 140 square meters per gram, 1.5 parts by weight of active silica may be added per hour for each part of silica already present as aggregates.

As the temperature is decreased, the rate of addition of active silica should likewise be decreased. Similarly, as the pH is decreased the addition rate of active silica should be decreased. The rate just mentioned for pH 10 should be decreased by a factor of about 2, if the pH is lowered to about 8. It will be understood that all pH readings are taken on samples cooled to 30° C.

The addition rate of active silica is also related to the sodium ion concentration. If the normality of Na$^+$ ion is decreased from 0.3 to 0.10, the rate of active silica addition should be decreased by a factor of about 2.

The proportion of silica accreted to the planar aggregates is not limited from the process standpoint. However, there is little advantage in carrying the process of accretion to an extreme. Indeed, in preparing the preferred products of this invention, the process of accretion is limited so that the original dense ultimate units of the aggregates do not lose their identity and the original aggregate's structure is not obscured.

On the other hand, the proportion of accreted silica must be sufficient to establish definitely a coalescence between the individual silica units in the aggregates. It is convenient to speak of the proportion of accretion as "build-up ratio." A build-up ratio of 1:1 means 1 part by weight of active silica has been caused to accrete to 1 part by weight of silica in the non-reinforced aggregate.

Ordinarily a build-up ratio of less than 10:1 will be used since at a build up ratio greater than this the accreted silica tends to cause the original planar aggregates to lose their identity. Ordinarily it will be desirable to use a build-up ratio of from 0.5:1 up to about 5:1. In the latter case it will be noted that the thickness of the planar aggregate will be increased roughly five-fold.

The product strengthened by heating or by the addition of active silica may be examined to determine the degree to which there has been cementing of the silica spheroids.

The extent of reinforcement of the planar aggregates or the strength of bonding between the spheroidal units may be determined by a method now to be described.

The places where the spheroids in the planar aggregate adhere to each other are referred to as junction points. In the planar aggregates which are reinforced by accretion of silica, according to the processes of this invention, the spheroids become cemented together at the "junction points." This cementing action has been called "coalescence." The degree of coalescence may be measured by a controlled depolymerization of silica, measuring what percent of the silica must be dissolved before the aggregates disintegrate to the ultimate spheroids which then disperse to a colloidal sol; this is called the "coalescence factor." This method is particularly important and effective in determining small degrees of strengthening. It will be obvious that where silica has been deposited upon the planar aggregates until they are greatly increased in thickness dissolution of even a large part of the silica will not cause the dispersion of the structure to the colloidal state. In these instances the increase in strength can be observed by mere inspection using the electron microscope.

The percentage of silica which must be dissolved in order to disintegrate the planar aggregates to units of colloidal size is called the "coalescence factor." A test has been devised in order to determine this factor. The sample, properly prepared, is suspended in and permitted to dissolve slowly in a dilute solution of alkali. During this dissolution, the course of the disintegration of the aggregates is observed by noting the decrease in the turbidity of the suspension. The aggregates, being supercolloidal in size, cause the suspension to be initially turbid; as the aggregates are distintegrated the turbidity of the suspension decreases and the transmission of light through the suspension increases. Simultaneously the amount of silica which has passed into solution is determined analytically. From a curve obtained by plotting the percentage transmission of light through the suspension versus the percent silica which has dissolved at the corresponding moment, the coalescence factor is determined as hereinafter described.

The test is applicable to products having a specific surface area in the range of 60 to 400 m.$^2$/g., which is the preferred range for the products of this invention. The coalescence factor is determined by the following standardized method: The specific surface area is measured by nitrogen adsorption, as already described. In characterizing the products of this invention by this technique it is necessary to remove from the product all acid-soluble material. The sample is therefore washed with hot (80–85° C.) 2 normal HCl for 30 minutes, then with distilled water to a pH of 4 using a minimum quantity of water, and then with acetone and dried under vacuum. Unless it is known that the dry powder is free from organic matter, a sample is ignited in a vertical tube in a slow stream of air, increasing the temperature in one hour from 250 to 450° C. Further ignition from 30 minutes at 450° C. in pure oxygen is employed to remove last traces of organic matter.

Where the product is colloidal in nature and cannot be purified by washing on a filter it may be purified by conventional ion exchange methods or by dialysis.

The coalescence determination is carried out on a sample of the wet silica containing 1 gram of solids. The sample is diluted to 100 ml. with water, warmed to 50° C. in a stirrer-equipped flask, and titrated with 1.0 N NaOH. Sufficient base is added immediately to raise the pH to about 11.2 (1.0 ml. per 90 m.$^2$/g. of specific surface area, but not less than 1.5 ml. nor more than 4 ml.), and further steady addition is maintained at such a rate as to hold the pH as close as possible to 11–11.5. During this treatment, depolymerization, or solution of polymeric silica, occurs because of the presence of hydroxyl ions. The product of this depolymerization is monomeric sodium silicate. The reaction of this monomeric silicate with acid molybdate reagent prepared from ammonium molybdate and sulfuric acid results in the formation of a yellow silico molybdate complex, $SiO_2 \cdot 12MoO_3 \cdot xH_2O$. It has been demonstrated that the color intensity of this complex is proportional to the amount of monosilicic acid which has reacted with the molybdate reagent. Not only does the molybdate reagent react rapidly with monomeric silicic acid, but the acid nature of the reagent practically arrests depolymerization of any high molecular weight colloidal silica present when an aliquot of the silica sample is mixed with the acid molybdate reagent. The reaction of this agent with monosilicic acid can therefore be used to determine the amount of monomer present in the depolymerizing solution at any given time.

The percentage transmission of light through the test solution and the percentage of the silica which has passed itno solution are measured as frequently as possible during the depolymerization treatment. Transmission is measured by means of a Model DU Beckman Quartz Spectrophotometer at a wavelength of 400 millimicrons and a cell length of 1 cm. In making the analysis for dissolved silica, a 0.1 ml. aliquot from the depolymerization medium is diluted to 50 ml. with a freshly prepared 0.1 N $H_2SO_4$ solution of ammonium molybdate (this solution contains 4.0 g. of $(NH_4)_6Mo_7O_{24} \cdot 4H_2O$ per liter) and the optical density of the resulting solution is measured on the spectrophotometer. Distilled water is used as the reference solution for these measurements. The depolymerization is followed in this manner until about 80 or 90% of the total silica has been dissolved. This may be estimated from the fact that the sample was chosen to contain about 1.0 mg. of silica, and under the conditions of this experiment, if all of the silica were in the form of monomer, the optical density would be 0.72. In order to accurately determine the total silica content of the aliquot taken, the solution is then made about 0.5 N in NaOH and heated in live steam in an alkali-resistant flask for at least 2 hours, so that the last traces of silica are depolymerized to monomer. Total silica is then determined by the molybdic acid method above, and percentage silica at any point during the polymerization is determined from the ratio of the optical density at that point to the optical density after all the silica in the sample was converted to monomer. There the percentage of silica involved in the bonding or coalescence of these ultimate units is shown by the position of the inflection point in a plot of percentage soluble silica versus transmission. The percentage soluble silica at the inflection point is termed the "coalescence factor" of the sample.

The novel products of this invention will preferably have a coalescence factor greater than about 30%. Products which have been strengthened only by heating as previously described may have coalescence factors which are even lower and may be as low as 15%. Products which have been strengthened by the addition of active silica to the planar aggregates will ordinarily have a coalescence factor greater than 30%.

THE NOVEL PRODUCTS

The novel products of the invention are planar aggregates of silica spheroids. As previously observed the spheroids preferably have a diameter greater than 5 millimicrons. The spheroids are preferably less than 100 millimicrons in diameter and more preferably less than 50. The planar aggregates will have an average dimension in the planar direction of at least 10 times the thickness or the diameter of the spheroidal units. Actually they will normally be many times larger and will be hundreds and even thousands of times greater in a planar dimension in thickness. Electron micrographs show that the planar aggregates exist as sheets which are as wide as 5 to 10 microns across, yet with a thickness less than 30 millimicrons.

It has been observed also that preferred products of the invention are those in which the planar aggregation is substantially a monolayer of spheroidal particles which are strengthened by heating or by the accretion of active silica thereupon.

The presence of planar aggregates can of course be demonstrated by examination of the products of this invention with an electron microscope. In addition it has been found that suspensions containing these aggregates have unusual film forming properties. Thus, if a one or two percent dispersion of these planar aggregates in water is spread on a glass surface and permitted to dry, a continuous coherent film is formed which is insoluble in water. In contrast, if the original sol from which the planar aggregates were formed is diluted to the same concentration and similarly dried a non-adherent dusty powder remains which is easily washed off with water. This film-forming characteristic constitutes a convenient test for the presence of flakes in suspensions made according to processes of the invention. For example, when small amounts of cationic surface active agents are employed in the processes of the invention, the development of planar aggregates in the reaction mixture may be conveniently followed by testing the film-forming nature of the suspension as just described.

Another way in which samples containing particularly well formed planar aggregates which are very thin can be characterized is to observe the material in suspension between crossed Polaroids while agitating the mixture vigorously. Under these conditions, well-formed, thin planar aggregates cause rotation of the plane of polarized light rendering the suspension visible where the planes are oriented by the motion of the liquid. This is commonly referred to as streaming birefringence.

The products may be recovered from the suspensions in which they are formed by methods which depend upon whether the planar aggregates are large enough to precipitate or whether they are present as a sol. Where the planar aggregates are of super-colloidal dimensions they may be recovered from the reaction mixture if desired by filtration, evaporation, or centrifuging. Where the planar aggregates are of colloidal dimension the sols may be used as such, or they may be concentrated by evaporation, they may be purified by treatment with ion exchange resins, electrodecantation or dialysis. Planar aggregates of both supercolloidal and colloidal dimensions can be recovered and separated from water by azeotropic distillation as with suitable liquids—for example, isopropyl alcohol or normal butyl alcohol.

The products may be used for a variety of purposes and may be in general applied for any of the numerous uses for which finely divided silica products have heretofore been employed. They may, for instance, be used in reinforcing rubber, thickening lubricating oils and greases, anti-caking agents, and textile sizing agents. Because of the peculiar shape of the products they are particularly useful in coating and film-forming compositions. They may, for instance, be included in paints, such as distemper paints, and water-emulsion paints of various types; they may be used in adhesives; they may be used with advantage in many of the places in which pulverized talc or mica heretofore has been employed, and they may be used as substrates for the formation of lakes.

Examples

In order that the invention may be better understood the following examples are given as illustrative in addition to those numerous examples which have already been described.

EXAMPLE 1

Two solutions were prepared as follows: (a) 1570 grams of sodium silicate containing 30% $SiO_2$, and having an $SiO_2:Na_2O$ mole ratio of 3.3 was diluted to a total volume of 11.2 liters, and (b) 186 grams of sulfuric acid (95.5% $H_2SO_4$) was diluted to a total volume of 11.2 liters. These solutions were fed simultaneously, separately, and at uniform rates over a 2 hour period into 14 l. of 0.1 N $Na_2SO_4$ adjusted to pH 10 with NaOH: $T=85°$ C. (The product was a silica sol containing 27 m$\mu$ particles.)

To 9.25 l. of this silica sol, 1.6 g. of cetyl trimethylammonium chloride in 925 ml. $H_2O$ was added (over ½ hr. at 95° C.). After 20 minutes 273 g. xylene was added.

Two feed solutions were prepared: (a) 930 g. of sodium silicate (containing 29.6% $SiO_2$ and having an $SiO_2/Na_2O$ mol ratio of 3.3) in 6.7 liters of water, and (b) 111 g. (95.5%) $H_2SO_4$ in 6.7 l. $H_2O$.

These solutions were added separately but simultaneously over 4¾ hours to the silica sol which had been coagulated with quaternary and treated with xylene.

A part of the product was filtered, reslurried and filtered twice, and washed with isopropanol. The nitrogen surface area of this product was 34.6 m.²/g.

A sample of the product was extracted as in Example 2, below. The result was a product with a nitrogen surface area of 39.9 m.$^2$/g. This product showed a definite flake-like character upon electron micrograph examination.

EXAMPLE 2

An emulsion of xylene in water was prepared in the following way: 62 grams of cetyl trimethylammonium chloride in a total of 4 liters of water was mixed with 17.3 grams of sodium sulfate and 400 grams of xylene. This mixture was brought to a temperature of 95° C.; an emulsion was the result.

Two feed solutions were prepared as follows: (a) 1570 grams of sodium silicate containing 30% SiO$_2$, and having an SiO$_2$:Na$_2$O mole ratio of 3.3 was diluted to a total volume of 11.2 liters, and (b) 186 grams of sulfuric acid (95.5% H$_2$SO$_4$) was diluted to a total volume of 11.2 liters.

These two feed solutions were fed separately, but simultaneously, into the emulsion as referred to in paragraph one. The feeds were introduced at a uniform rate and over a period of six hours.

The silica slurry so obtained was treated with 3 volumes of isopropyl alcohol for 10 volumes of product, filtered, reslurried, filtered and washed with isopropyl alcohol. (A sample of this material was dried; it had a dye surface area of 19 m.$^2$/g.)

Two hundred grams of this precipitate was slurried in 500 grams of water and treated with 400 grams of concentrated hydrochloric acid (containing 35% HCl) and 1 liter of isopropyl alcohol, and refluxed for 16 hours. The product was filtered, resuspended and refluxed in fresh hydrochloric acid and isopropanol for an additional 2 hours. This product was filtered, washed, resuspended, filtered, washed, resuspended, treated with sodium hydroxide solution until the pH rose to 7, filtered, washed, and resuspended in water. The pH of this solution was 6, sodium hydroxide solution was added until the pH rose to 7, the product was filtered, washed, and dried.

This material had a very definite flake-like character, as shown by electron micrographs. It had a surface area as measured by nitrogen adsorption of 127 m.$^2$/g., and a bulk density of 0.224 gram per ml.

EXAMPLE 3

A xylene-water emulsion was prepared as follows: To one liter of water, 20 grams of an equimolar mixture of lorol and cetyl trimethylammonium bromide was added. To this, 222 grams of xylene was added with vigorous stirring over a period of 15 minutes, and at a temperature of 95° C. The resulting emulsion was later reacted with a silica sol, referred to as alkalized effluent.

A silica sol was next prepared by ion-exchange as follows: A sodium silicate solution was prepared by mixing 1050 grams of "F" grade sodium silicate (containing 30% SiO$_2$ and having an SiO$_2$:Na$_2$O mole ratio of 3.3) with water and diluting to a total volume of 10 liters. This sodium silicate solution was passed downflow through an ion exchange resin in the hydrogen form. To the resulting effluent there was added 33 grams of "F" grade sodium silicate. Thus, a silica sol containing 3% SiO$_2$ and having an SiO$_2$:Na$_2$O ratio of 100 was prepared. This sol will hereinafter be referred to as alkalized effluent.

Three liters of the alkalized effluent was heated to a temperature of 95° C. for one hour. By this heating process, the ultimate silica particles in the sol grew to about 5 millimicrons in diameter. These particles were then reacted with the xylene emulsion to form flakes of silica. While the temperature was maintained at 95° C., the xylene-water emulsion was added with vigorous stirring and over a period of 15 minutes.

The ultimate particles of the flake-like silica were cemented together by an accretion process as follows: 6 liters of unheated, alkalized effluent were added to the reaction flask containing the silica flakes over a period of four hours, while maintaining the temperature at 95° C., and the system in a state of vigorous agitation. At the end of this time, the slurry was filtered, the recovered silica was washed, reslurried in water and the pH of the reslurry adjusted to 5 with dilute H$_2$SO$_4$, and again filtered. The wet cake was split into two parts:

A part of the water-wet filter cake was dried directly. The resulting products had a surface area by nitrogen adsorption of about 197 m.$^2$/g., and had a distinct flake-like character as determined by electron microscope.

A second part of the wet filter cake was slurried in n-butanol and dehydrated by azeotropic distillation. This dehydrated slurry of silica in n-butanol was heated in a closed vessel to 300° C. for ½ hour, cooled, filtered to remove the excess butanol, and finally dried in a vacuum oven at 120° C. The density of the product under a load of 3 p. s. i. was 0.127 g./ml. By mixing 50 parts of this product with 50 parts of Mid-Continent, solvent treated, hydrocarbon oil, and milling for 7 passes on a Kent roll ink mill at a clearance of 0.0015", diluted with an additional 25 parts of oil and milling as before, diluting with 75 parts oil and milling, and finally diluting with 200 parts oil and milling, a clear grease having a micropenetration of 170 was obtained.

EXAMPLE 4

A silica sol was prepared by feeding two solutions, (a) a sodium silicate solution containing 4% SiO$_2$ and having an SiO$_2$:Na$_2$O mol rate of 3.3, and (b) 1.57% sulfuric acid, separately, simultaneously, and at uniform rates into a heel of 0.1 N Na$_2$SO$_4$ solution adjusted to pH 10 with NaOH. The reaction was run at 95° C. The heel had a volume of 3.5 l.; 2.75 l. of each feed was added over a period of 2 hours. (The sol thus prepared contained 1.22% SiO$_2$, the silica particles after recovery from the sol had a surface area by nitrogen adsorption of 134 m.$^2$/g., and an average particle size as determined by electron micrograph of 27 m$\mu$.)

A solution of cetyl trimethylammonium chloride containing 0.01 g. of reagent per liter was prepared.

To 10 liters of the silica sol as prepared in paragraph 1, 1 liter of the quaternary solution was added over ½ hour, and with vigorous stirring.

A micrograph of the resulting sol showed that small flake-like aggregates had formed.

EXAMPLE 5

Example 4 was repeated using a solution containing 0.02 g. of cetyl trimethylammonium chloride/liter solution.

In this case, a more turbid sol resulted, which, on examination with electron microscope, showed definite sheet-like structures.

EXAMPLE 6

Example 4 was repeated using 10 g. of cetyl trimethylammonium chloride.

A precipitate was obtained, which, on examination with the electron microscope, showed both sheet-like and three-dimensional aggregates.

EXAMPLE 7

A 30% colloidal silica sol containing dense, amorphous, discrete, colloidal silica spheroids with an average ultimate particle diameter of about 17 millimicrons was prepared in a manner similar to that described in Example 1 of copending U. S. application Serial No. 65,536 to Bechtold and Snyder, filed December 15, 1948. The sol had a chemical analysis of 30.3% SiO$_2$, 0.34% titratable alkalinity as Na$_2$O, 0.099% sulfate ion calculated as sodium sulfate, and 0.027% chloride ion calculated as sodium chloride. The pH of the sol was 9.79. A portion of this sol was diluted with distilled water to bring the silica concentration to about 10%. This 10% sol was deionized to pH 3.4 with a mixed anion and cation exchange resin. The pH was then adjusted to 9.9 with standard sodium hydroxide.

37.1 milliliters of the 10% sol (to contain 4.5 grams

SiO₂) was then diluted to 2% silica. This sol was charged to a three-neck, round-bottom flask fitted with a heating mantle and stirrer, and heated to 100° C.

A standard solution of cetyl trimethylammonium bromide was prepared to contain 0.001 gram per milliliter of solution. 48.4 milliliters of this solution (1.08% cetyl trimethylammonium bromide, based on the SiO₂) was diluted with 176.6 milliliters of distilled water and was added to the refluxing silica sol through a burette. This yielded a final silica concentration of 1%. Reflux was maintained for 30 minutes longer to further cement the particles together and at the end of this time, extensive coagulation had taken place. The solution was discharged and cooled.

An electron micrograph of the resulting product, showed that aggregation had taken place to form flakes essentially 1 particle in thickness. A sample of the sol was poured onto a polished glass plate and allowed to dry, forming a continuous coherent film which was not removed by a stream of water. In contrast, a sample of the starting material was diluted to 1% SiO₂ and tested in the same manner. It formed a highly crazed film which was almost entirely removed by a stream of water.

EXAMPLE 8

A silica sol containing 3.1% silica was prepared by passing a sodium silicate solution downflow through an ion-exchange column containing resin in the hydrogen form. This effluent was alkalized to a pH of 8.6 with sodium hydroxide.

The resulting alkalized effluent was heated for a period of 10 hours at 100° C., and then allowed to cool slowly to room temperature. This material contained 3.5% silica, and an electron micrograph showed that the silica was present in the form of spherical particles about 10 millimicrons in diameter.

The sol was deionized to a pH of 4 with a mixed cation-anion exchange resin to remove ionic impurities, and then was re-alkalized to a pH of 9.9 with a standard solution of sodium hydroxide.

124.5 mls. of this sol (to contain 4.5 grams SiO₂) was diluted to 2% SiO₂ and used as a heel in a "Waring Blendor." A solution of 0.0737 gram of cetyl trimethylammonium bromide (1.6% based on the silica) in 225 mls. of distilled water was added through a burette to the agitated heel over a period of 1 minute. Agitation was maintained for 1 minute longer, and the resulting 1% silica sol was discharged. Some flocculation had occurred. An electron micrograph of the product showed that where flocculation had occurred, small flakes had formed, but that the coagulation was not extensive. A sample of the sol was poured onto a polished glass plate and allowed to dry. The resulting film showed some crazing, although it was improved as compared to a control film prepared from the starting sol.

A sample of the final sol was then refluxed for 30 mins. to increase the extent of coagulation. The resulting material was cooled and discharged. An electron micrograph showed that the flakes formed were still essentially one particle in thickness, but were much larger in area. In addition, the coagulation was more extensive. A sample was poured out on a glass plate and allowed to dry. The film was continuous and cohesive.

EXAMPLE 9

One liter of the alkalized effluent prepared in Example 8 (pH—8.6, percent SiO₂—3.1%) was charged to a small circulating reaction system, in which the reaction pot consisted of a 2 liter, round bottomed flask, fitted with inlet and outlet tubes connected through a closed system which included a small centrifugal pump, a capillary inlet tube for feeding solutions into the system, and a steam jacket for heating the circulating fluid.

A solution of 0.45 gm. of cetyl trimethylammonium bromide (1.5% based on the SiO₂) in 200 mls. of distilled water was prepared and placed for admission through the capillary feed tube.

Circulation and heating were begun. When the temperature of the sol had reached 85° C., the quaternary solution was added to the circulating system over a period of 30 mins. Initially, the sol became quite viscous. With continued heating, the sol became more turbid and less viscous. Heating and circulation were maintained over a 2½ hr. period. The temperature varied between 60–85° C., as the temperature of the heating jacket was varied to control the foaming which occurred in the early stages of the reaction. The final sol was cooled and discharged. It had a pH of 9.3.

An electron micrograph of the final sol showed that extensive flakes had been formed. They were composed of tiny silica spheroids, in the range of 5 millimicrons in diameter. The flakes were again essentially one particle in thickness.

The final slurry, when diluted with an equal volume of water and viewed between crossed nicols exhibited weak streaming birefringence, due to the very thin flakes present in the sol. A sample was diluted to 1% SiO₂, and poured onto a polished glass plate. The dried film was continuous, coherent, and showed considerable wash-resistance.

A portion of the final sol was centrifuged and the precipitate was collected. This translucent gel was slurried in distilled water, the pH was adjusted from 9.3 to 5 with concentrated hydrochloric acid, and the slurry was filtered. The wet cake was transferred to n-propanol, and the water was removed by azeotropic distillation. The silica was then filtered and dried, and was found to be white, fluffy, and free-flowing. It had a specific surface area as measured by nitrogen adsorption, of 311 square meters per gram.

We claim:

1. Planar aggregates of silica spheroids, each of said spheroids having a diameter greater than 5 millimicrons and less than 100 millimicrons, the aggregates being not more than 3 spheroid layers thick and having an average dimension in the planar direction of at least 10 times the thickness.

2. Planar aggregates of silica spheroids, each of said spheroids having a diameter greater than 5 millimicrons and less than 50 millimicrons the aggregates being not more than 3 spheroid layers thick and having an average dimension in the planar direction of at least 10 times the thickness.

3. Planar aggregates of a mono-layer of amorphous silica spheroids, each of said spheroids having a diameter greater than 5 millimicrons and less than 50 millimicrons, the aggregates having an average dimension in the planar direction of at least 10 times the thickness.

4. Planar aggregates of silica spheroids, each of said spheroids having a diameter greater than 5 millimicrons and being cemented with silica, the aggregates being not more than 3 spheroid layers thick and having an average dimension in the planar direction of at least 10 times the thickness.

5. Planar aggregates of silica spheroids, each of said spheroids having a diameter greater than 5 millimicrons and being cemented with silica until coalescence is greater than 30%, the aggregates being not more than 3 spheroid layers thick and having an average dimension in the planar direction of at least 10 times the thickness.

6. In a process for making a planar aggregate of silica spheroids from an aqueous sol having a pH of 5 to 10.7 and composed of negatively charged silica spheroids 5 to 100 millimicrons in diameter, the steps comprising adding a cationic surface active agent to form a planar aggregate, the amount of the cationic surface active agent in mols per 100 grams of silica being not more than two divided by the diameter of the silica spheroids in millimicrons, and then heating the resulting aqueous suspension of planar aggregates at a temperature above 60° C. to strengthen them.

7. In a process for making a planar aggregate of silica spheroids from an aqueous sol having a pH of 5 to 10.7 and composed of negatively charged silica spheroids 5 to 100 millimicrons in diameter, the steps comprising adding a cationic surface active agent to form a planar aggregate, the amount of the cationic surface active agent in mols per 100 grams of silica being not more than two divided by the diameter of the silica spheroids in millimicrons, and then adding active silica to the resulting aqueous suspension of planar aggregates to strengthen them.

References Cited in the file of this patent

UNITED STATES PATENTS

| | | |
|---|---|---|
| 2,535,659 | Wolff | Dec. 26, 1950 |
| 2,561,304 | Hazel | July 17, 1951 |

UNITED STATES PATENT OFFICE

CERTIFICATE OF CORRECTION

Patent No. 2,801,902                                                      August 6, 1957

Guy B. Alexander et al.

It is hereby certified that error appears in the printed specification of the above numbered patent requiring correction and that the said Letters Patent should read as corrected below.

Column 4, line 27, for "th" read -- the --; column 6, line 7, for "tracts" read -- traces --; line 75, for "the xylene is dispersed and forms an emulsion" read -- face-active agent to promote growth of the particles --; column 12, line 75, for "itno" read -- into --.

Signed and sealed this 8th day of October 1957.

(SEAL)
Attest:

KARL H. AXLINE
Attesting Officer

ROBERT C. WATSON
                                                                             Commissioner of Patents